United States Patent
Hosoda et al.

(10) Patent No.: US 11,265,841 B2
(45) Date of Patent: Mar. 1, 2022

(54) POSITION ESTIMATION METHOD AND POSITION ESTIMATION APPARATUS

(71) Applicant: NIPPON TELEGRAPH AND TELEPHONE CORPORATION, Tokyo (JP)

(72) Inventors: Masamichi Hosoda, Musashino (JP); Yasushi Hanakago, Musashino (JP); Tadashi Mori, Musashino (JP); Masaru Miyamoto, Musashino (JP); Tomoki Murakami, Musashino (JP); Makoto Umeuchi, Musashino (JP); Hiroshi Sakamoto, Musashino (JP); Tomoaki Ogawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/059,092

(22) PCT Filed: May 23, 2019

(86) PCT No.: PCT/JP2019/020546
§ 371 (c)(1),
(2) Date: Nov. 25, 2020

(87) PCT Pub. No.: WO2019/230572
PCT Pub. Date: Dec. 5, 2019

(65) Prior Publication Data
US 2021/0227487 A1    Jul. 22, 2021

(30) Foreign Application Priority Data
May 30, 2018   (JP) .............................. JP2018-104037

(51) Int. Cl.
*H04W 64/00* (2009.01)
*H04B 17/309* (2015.01)

(52) U.S. Cl.
CPC .......... *H04W 64/00* (2013.01); *H04B 17/309* (2015.01)

(58) Field of Classification Search
CPC ........................... H04W 64/00; H04B 17/309
See application file for complete search history.

(56) References Cited

U.S. PATENT DOCUMENTS

| 2004/0258012 A1 | 12/2004 | Ishii |
| 2009/0291694 A1 | 11/2009 | Yano et al. |
| 2017/0006422 A1* | 1/2017 | Kim ...................... H04W 64/00 |

FOREIGN PATENT DOCUMENTS

| JP | 2004350088 A | 12/2004 |
| JP | 2009281793 A | 12/2009 |
| JP | 201087896 A | 4/2010 |

OTHER PUBLICATIONS

Seigo Ito et al., Studies on Construction Method for Wide-area Positioning Using Wireless LAN, Journal of the Information Processing Society, vol. 47, No. 12, 2006, pp. 3124-3136.

(Continued)

*Primary Examiner* — Curtis B Odom
(74) *Attorney, Agent, or Firm* — Harness, Dickey & Pierce, P.L.C.

(57) ABSTRACT

An object is to enable high-accuracy position estimation of a wireless terminal station by efficiently performing connection between a wireless base station and the wireless terminal station using multiple distributed antennas. A position estimation apparatus configured to estimate a position of a wireless terminal station between a wireless base station that can perform transmission and reception by switching between a plurality of distributed antennas arranged in a distributed manner via cables with known lengths, and the (Continued)

wireless terminal station configured to communicate with the wireless base station, includes: a means 1 for measuring a no-delay RTT or measuring a statistical processing RTT when the wireless base station exchanges a measurement signal and a response signal with the wireless terminal station in each of the distributed antennas and measures an RTT, which is a round trip time between the wireless base station and the wireless terminal station, a delay time having been removed from the no-delay RTT using a reception time of the measurement signal and a transmission time of the response signal, and the statistical processing RTT being measured using statistical processing for making the delay time constant using a plurality of instances of exchanging a measurement signal and a response signal; and means 2 for estimating the position of the wireless terminal station based on the no-delay RTT or the statistical processing RTT of each of the distributed antennas.

7 Claims, 10 Drawing Sheets

(56) References Cited

OTHER PUBLICATIONS

M. Llombart, et al., On the scalability of a novel WLAN positioning system based on time of arrival measurements, Proc. IEEE WPNC, Mar. 27, 2008.
Fine timing measurement (FTM) procedure, IEEE Std 802.11, Dec. 7, 2016, p. 1789-1800.

* cited by examiner

POSITION ESTIMATION METHOD AND POSITION ESTIMATION APPARATUS

CROSS-REFERENCE TO RELATED APPLICATIONS

This application is a 371 U.S. National Phase of International Application No. PCT/JP2019/020546, filed on May 23, 2019, which claims priority to Japanese Application No. 2018-104037 filed on May 30, 2018. The entire disclosures of the above applications are incorporated herein by reference.

TECHNICAL FIELD

The present invention relates to a position estimation method and a position estimation apparatus for estimating a position of a wireless terminal station based on a position of a wireless base station.

BACKGROUND ART

Conventional Example 1

There is a method in which a wireless terminal station receives signals transmitted from multiple base stations with known positions and the RSSIs (Received Signal Strength Indicators) of the wireless base stations are calculated, and thereby a two-dimensional position of the wireless terminal station is estimated (NPL 1).

With this method, a smartphone or the like is used as the wireless terminal station, beacons transmitted periodically from multiple wireless LAN access points or probe responses transmitted in response to probe requests from the smartphone or the like are received as signals transmitted by the wireless base stations, the RSSI is measured for each wireless base station, and the position of the wireless terminal station obtained using the values of the RSSIs and the positions of the wireless base stations as references is estimated.

Conventional Example 2

Similarly, there is a method in which signals are exchanged between the multiple wireless base stations with known positions and a wireless terminal station, the RTT (Round Trip Time) is estimated, and the two-dimensional position of the wireless terminal station is estimated by further estimating the ToA (Time of Arrival) between the wireless base stations and the wireless terminal station (NPL 2).

In this method, as shown in FIG. 10, the wireless terminal station transmits measurement signals to the multiple wireless base stations and receives response signals from the wireless base stations, the wireless terminal station estimates the RTT for each wireless base station based on the transmission start time of the measurement signal and the reception start time of the response signal, and furthermore calculates a time of arrival ToA (=RTT/2) between the wireless terminal station and the wireless base station based on the RTT, and the position of the wireless terminal station is estimated using that difference and the positions of the wireless base stations as references.

Conventional Example 3

There is a method in which FTM (Fine Timing Measurement) conforming to IEEE Std. 802.11-2016 is used to measure the ToF (Time of Flight) between the wireless base station and the wireless terminal station and to estimate the position of a wireless terminal station (NPL 3).

In this method as well, the position of the wireless terminal station can be measured similarly to the procedure of calculating based on the RTT in Conventional Example 2.

CITATION LIST

Non Patent Literature

[NPL 1] S. Ito, H. Yoshida, and N. Kawaguchi. "Study on wide-area position information system construction using wireless LAN." IPSJ Journal, Vol. 47, No. 12, pp. 3124-3136, December 2006

[NPL 2] M. Llombart, M. Ciurana, and F. Barcelo-Arroyo. "On the scalability of a novel WLAN positioning system based on time of arrival measurements." Proc. IEEE WPNC, 2008.

[NPL 3] IEEE Std. 802.11-2016, 11.24.6 Fine timing measurement (FTM) procedure, pp. 1789-1800, Dec. 7, 2016.

SUMMARY OF THE INVENTION

Technical Problem

With the method of Conventional Example 1, each wireless base station (wireless LAN access point) is set to an individual channel, and the transmission times of the beacons are also different. For this reason, in order for the wireless terminal station (smartphone, etc.) to sequentially find wireless base stations in the surrounding area, the wireless terminal station sequentially switches the channel during breaks in its own communication, and time is needed to wait for the beacons from the wireless base stations, transmit probe requests, and wait for probe responses. If the wireless terminal station is not moving, positioning need only be performed by taking time to sequentially find wireless base stations, but if the wireless terminal station is moving, the position of the wireless terminal station will change during communication, and thus correct positioning will no longer be possible.

In this manner, Conventional Example 2 and Conventional Example 3 have a similar problem in that the processing time for the wireless terminal station to sequentially find the multiple wireless base stations is proportional to the number of wireless base stations.

Furthermore, with the method of Conventional Example 1, the RSSI changes from moment to moment even in a short amount of time due to interference in the surrounding area, phasing, and the like, and therefore a lot of variation is observed when measurement is performed continuously. However, when the measurement time is limited as described above, instantaneous measurement that varies is performed, and therefore error increases and correct positioning is no longer possible.

The present invention aims to provide a position estimation apparatus and a method for enabling high-accuracy position estimation of a wireless terminal station by efficiently performing connection between a wireless base station and a wireless terminal station using the wireless base station main body and multiple distributed antennas that are arranged in a distributed manner via cables.

Means for Solving the Problem

The invention according to a first aspect is a position estimation apparatus configured to estimate a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation apparatus including: means 1 for measuring a no-delay RTT or measuring a statistical processing RTT when the wireless base station exchanges a measurement signal and a response signal with the wireless terminal station in each of the distributed antennas and measures an RTT, which is a round trip time between the wireless base station and the wireless terminal station, a delay time having been removed from the no-delay RTT using a reception time of the measurement signal and a transmission time of the response signal, and the statistical processing RTT being measured using statistical processing for making the delay time constant using a plurality of instances of exchanging a measurement signal and a response signal; and means 2 for estimating the position of the wireless terminal station based on the no-delay RTT or the statistical processing RTT of each of the distributed antennas.

In the position estimation apparatus according to the first aspect of the invention, the wireless terminal station is configured to move on a straight line on which two or more of the distributed antennas are arranged in one dimension, and the means 2 is configured to estimate a one-dimensional position of the wireless terminal station using a difference between the no-delay RTTs or a difference between the statistical processing RTTs obtained via the distributed antennas.

In the position estimation apparatus according to the first aspect of the invention, the wireless terminal station is configured to move on a two-dimensional plane on which three or more of the distributed antennas are arranged or in a three-dimensional space in which four or more of the distributed antennas are arranged; and the means 2 is configured to estimate a two-dimensional position or a three-dimensional position of the wireless terminal station by combining the positions of the distributed antennas and the no-delay RTTs or the statistical processing RTTs obtained for every two of the distributed antennas.

A second aspect of the invention is a position estimation apparatus configured to estimate a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation apparatus including: means 1 for measuring a statistical processing RSSI, when the wireless base station exchanges a measurement signal and a response signal with the wireless terminal station in each of the distributed antennas and measures an RSSI, which is a received signal strength indicator of the wireless base station, the statistical processing RSSI being measured using statistical processing for eliminating an RSSI measurement error using a plurality of instances of exchanging a measurement signal and a response signal; and means 2 for estimating the position of the wireless terminal station based on the statistical processing RSSI of each of the distributed antennas.

In the position estimation apparatus according to the second aspect of the invention, the wireless terminal station is configured to move on a straight line on which two or more of the distributed antennas are arranged in one dimension, and the means 2 is configured to estimate a one-dimensional position of the wireless terminal station by using a distance between the distributed antennas, transmission loss coefficients of the distributed antennas, and a difference between the statistical processing RSSIs obtained via the distributed antennas.

In the position estimation apparatus according to the second aspect of the invention, the wireless terminal station is configured to move on a two-dimensional plane on which three or more of the distributed antennas are arranged or in a three-dimensional space in which four or more of the distributed antennas are arranged; and the means 2 is configured to estimate a two-dimensional position or a three-dimensional position of the wireless terminal station by combining the positions of the distributed antennas, distances between the distributed antennas, the transmission loss coefficients of the distributed antennas, and differences between the statistical processing RSSIs obtained for every two of the distributed antennas.

A third aspect of the invention is a position estimation method for estimating a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation method including: a step 1 of measuring a no-delay RTT or measuring a statistical processing RTT when the wireless base station exchanges a measurement signal and a response signal with the wireless terminal station in each of the distributed antennas and measures an RTT, which is a round trip time between the wireless base station and the wireless terminal station, a delay time having been removed from the no-delay RTT using a reception time of the measurement signal and a transmission time of the response signal, and the statistical processing RTT being measured using statistical processing for making the delay time constant using a plurality of instances of exchanging a measurement signal and a response signal; and a step 2 of estimating the position of the wireless terminal station based on the no-delay RTT or the statistical processing RTT of each of the distributed antennas.

A fourth aspect of the invention is a position estimation method for estimating a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation method including: a step 1 of measuring a statistical processing RSSI when the wireless base station exchanges a measurement signal and a response signal with the wireless terminal station in each of the distributed antennas and measures an RSSI, which is a received signal strength indicator of the wireless base station, the statistical processing RSSI being measured using statistical processing for eliminating an RSSI measurement error using a plurality of instances of exchanging a measurement signal and a response signal; and a step 2 of estimating the position of the wireless terminal station based on the statistical processing RSSI of each of the distributed antennas.

Effects of the Invention

The present invention can perform positioning due to one wireless base station and a wireless terminal station merely exchanging positioning signals using multiple distributed antennas of the wireless base station, and can perform rapid positioning without the wireless terminal station switching channels or waiting for a signal from a wireless base station. For this reason, even if the wireless terminal station is moving, high-accuracy positioning is possible.

Furthermore, by using a no-delay RTT, a statistical processing RTT, or a statistical RSSI, it is possible to perform more accurate positioning in which individual variations in RTT and RSSI are removed.

DESCRIPTION OF EMBODIMENTS

Figure 1:
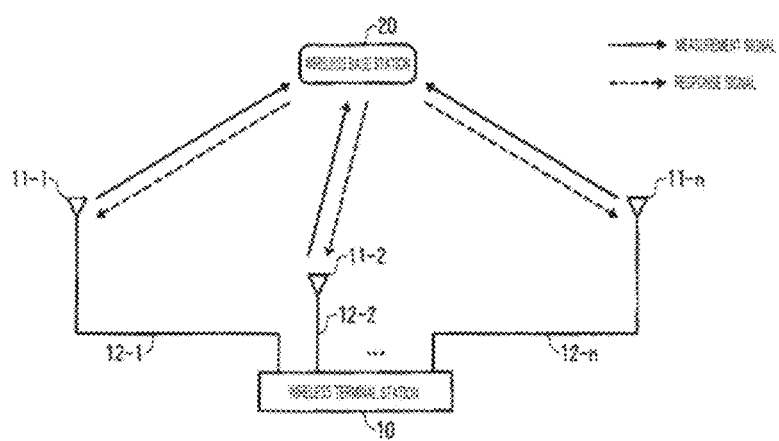
FIG. 1 is a diagram showing an overall configuration of a position estimation apparatus of the present invention.

FIG. 1 shows an overall configuration of a position estimation apparatus of the present invention.

In FIG. 1, in a wireless base station 10, distributed antennas 11-1 to 11-$n$ that are arranged in a distributed manner are connected via cables 12-1 to 12-$n$ of a known length. n is an integer that is 2 or more. The positions of the distributed antennas 11-1 to 11-$n$ are known.

Figure 2:
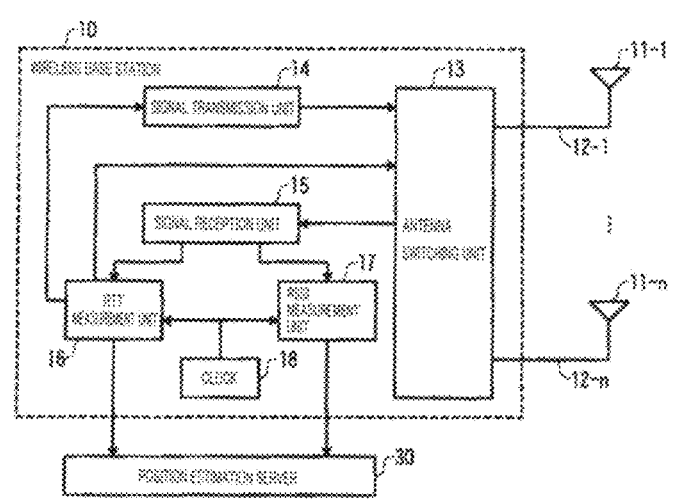
FIG. 2 is a diagram showing an example of a configuration of a wireless base station 10.

FIG. 2 shows an example of a configuration of the wireless base station 10.

In FIG. 2, the wireless base station 10 includes an antenna switching unit 13, a signal transmission unit 14, a signal reception unit 15, an RTT measurement unit 16, an RSSI measurement unit 17, and a clock 18, and a position estimation server 30 is connected to the RTT measurement unit 16 and the RSSI measurement unit 17.

Figure 3:
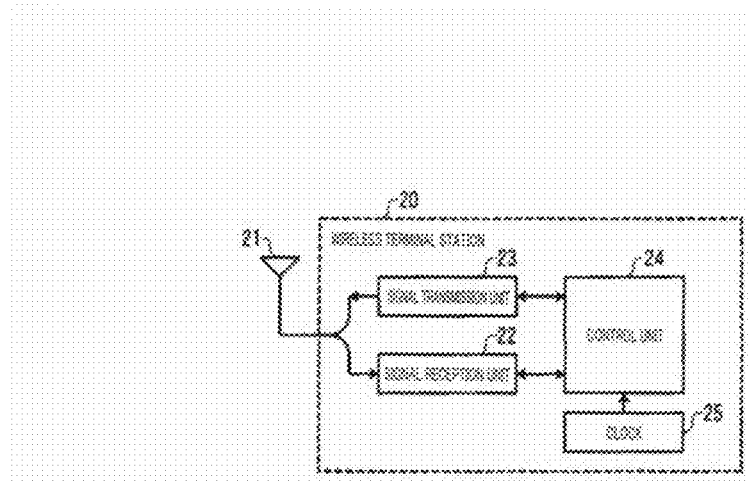
FIG. 3 is a diagram showing an example of a configuration of a wireless terminal station 20.

FIG. 3 shows an example of a configuration of a wireless terminal station 20.

In FIG. 3, the wireless terminal station 20 includes an antenna 21, a signal reception unit 22, a signal transmission unit 23, a control unit 24, and a clock 25.

Figure 4:
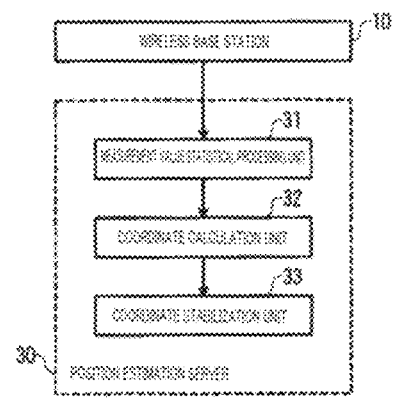
FIG. 4 is a diagram showing an example of a configuration of a position estimation server 30.

FIG. 4 shows an example of a configuration of the position estimation server 30.

In FIG. 4, the position estimation server 30 includes a measurement value statistical processing unit 31, a coordinate calculation unit 32, and a coordinate stabilization unit 33.

Coordinate position estimation processing performed by the wireless terminal station 20 will be described based on the above configuration.

The wireless base station 10 performs processing for connecting to the wireless terminal station 20 via the distributed antennas 11-$i$ (i=1 to n). The RTT measurement unit 16 controls the antenna switching unit 13 to select the distributed antenna 11-$i$ and transmits a measurement signal from the signal transmission unit 14 to the wireless terminal station 20 via the distributed antenna 11-$i$.

The wireless terminal station 20 receives the measurement signal in the signal reception unit 22 via the antenna 21. The control unit 24 generates a response signal in response to the measurement signal and transmits the response signal from the signal transmission unit 23 via the antenna 21.

The wireless base station 10 receives the response signal in the signal reception unit 15 via the distributed antenna 11-$i$ and notifies the RTT measurement unit 16 and the RSSI measurement unit 17. The RTT measurement unit 16 measures the round trip time RTT starting from the transmission of the measurement signal to the reception of the response signal and outputs the result to the position estimation server 30. The RSSI measurement unit 17 measures the received signal strength indicator RSSI of the response signal and outputs the result to the position estimation server 30.

The wireless base station 10 and the wireless terminal station 20 repeat the above-described processing while sequentially switching between the distributed antennas 11-1 to 11-$n$. The position estimation server 30 estimates the position coordinate of the wireless terminal station 20 based on the obtained RTTs, the times of arrival ToA (=RTT/2), and the RSSIs of the response signals.

(1) Removal of Measurement Error of RTT

The RTT includes a terminal delay time from the reception of the measurement signal to the transmission of the response signal in the wireless terminal station 20, and thus variation occurs in the terminal delay time depending on the state of the wireless terminal station 20, and this variation is the measurement error of the RTT. As methods for removing the measurement error of the RTT, (1-1) a "no-delay RTT" that does not include a terminal delay time is calculated, (1-2) many instances of measurement are performed in a short amount of time and a "statistical processing RTT" from which variation has been removed statistically is measured, or (1-3) both methods are used.

(1-1) No-Delay RTT Measurement Method

Figure 5:
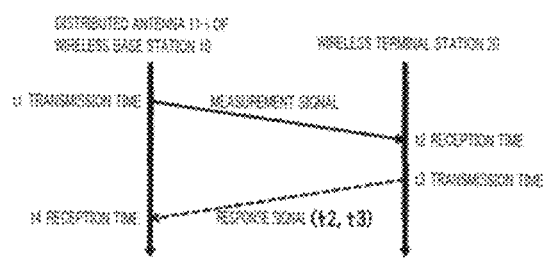
FIG. 5 is a diagram showing a no-delay RTT measurement method 1.

FIG. 5 shows a no-delay RTT measurement method 1.

In FIG. 5, the signal transmission unit 14 of the wireless base terminal 10 transmits the measurement signal from the distributed antenna 11-$i$ (i being 1 to n) and the RTT measurement unit 16 records the transmission time t1. Upon receiving the measurement signal, the wireless terminal station 20 sends back a response signal. At this time, the control unit 24 may record the reception time t2 of the measurement signal and the transmission time t3 of the response signal, and may notify the wireless base station 10 by superimposing (t2, t3) or a signal other than the response signal on the response signal. When the signal reception unit 15 of the wireless base station 10 receives the response signal via the distributed antenna 11-$i$, the RTT measurement unit 16 records the reception time t4 thereof and acquires (t2, t3) that were notified by the wireless terminal station 20. Accordingly, the RTT measurement unit 16 of the wireless base station 10 can obtain the RTT(i) between the distributed antenna 11-$i$ and the wireless terminal station 20 as follows.

$$RTT(i)=(t4-t1)-(t3-t2)$$

Here, the RTT(i) of the distributed antenna 11-$i$ of the wireless base station 10 and the RTT(i) of the wireless terminal station 20 is a no-delay RTT(i) that does not include the terminal delay time (t3-t2) from the reception of the measurement signal to the transmission of the response signal in the wireless terminal station 20.

The RTT measurement unit 16 of the wireless base station 10 measures the no-delay RTT(1) to RTT(n) and transmits them to the position estimation server 30 while switching the distributed antennas 11-1 to 11-n.

Figure 6:
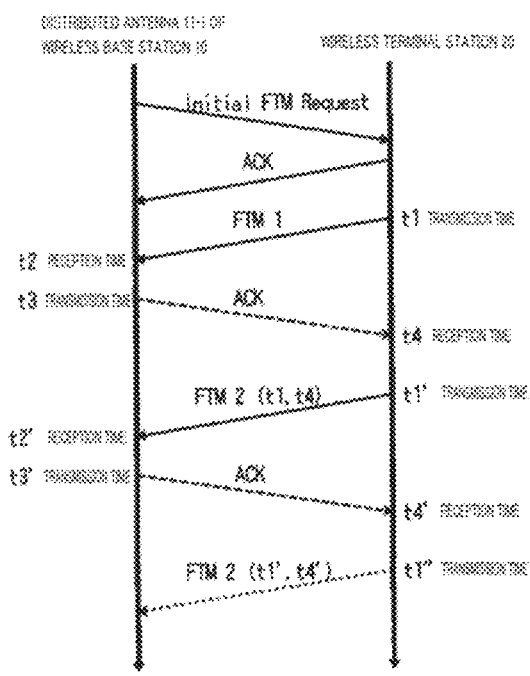
FIG. 6 is a diagram showing a no-delay RTT measurement method 2.

FIG. 6 shows an RTT measurement method 2 (NPL 3).

In FIG. 6, the wireless base station 10 is an initiator and the wireless terminal station 20 is a responder. In the wireless base station 10, the RTT measurement unit 16 functions as an initiator to transmit an Initial FTM Request from the signal transmission unit 14 to the wireless terminal station 20 via the distributed antenna 11-i, and requests a designated number of instances of transmission of the measurement signal from the wireless terminal station 20. When the signal reception unit 22 receives the Initial FTM Request, the control unit 24 sends back a response signal ACK from the signal transmission unit 23 and the wireless terminal station 20 starts operating as a responder.

The signal transmission unit 23 of the wireless terminal station 20 transmits a first measurement signal FTM1 and the control unit 24 records the transmission time t1. The wireless base station 10 sends back the response signal ACK upon receiving the FTM1. At this time, the RTT measurement unit 16 records the reception time t2 of the FTM1 and the transmission time t3 of the ACK. The wireless terminal station 20 transmits the next measurement signal FTM2 upon receiving the ACK. At this time, the control unit 24 records the reception time t4 of the ACK and the transmission time t1' of the FTM2 and includes (t1, t4) of the previous instance in the FTM2. Hereinafter, exchange of the measurement signal FTM and the response signal ACK continues until the number of instances designated in the first request is reached, and the wireless base station 10 and the wireless terminal station 20 record the transmission and reception times and provide (t1, t4) of the previous instance to the measurement signal.

Accordingly, the wireless base station 10 can receive the measurement signal FTM including (t1, t4) of the previous instance, and the RTT measurement unit 16 can obtain the RTT(i) between the distributed antenna 11-i and the wireless terminal station 20, along with (t2, t3) of the previous instance.

$$RTT(i)=(t4-t1)-(t3-t2)$$

Here, in the present sequence, the directions of the measurement signal and the response signal of FIG. 5 are reversed, but the no-delay RTT(i) between the distributed antenna 11-i of the wireless base station 10 and the wireless terminal station 20 can be measured using the wireless base station 10 as a trigger.

The RTT measurement unit 16 of the wireless base station 10 measures the no-delay RTT(1) to RTT(n) and transmits them to the position estimation server 30 while switching the distributed antennas 11-1 to 11-n.

Note that in order to measure the no-delay RTT(i), it is necessary to record and provide the time information obtained by the clocks 18 and 25 in the wireless base station 10 and the wireless terminal station 20 respectively. However, some wireless terminal stations 20 do not support the function of providing the clock information, and in such a case, the statistical processing RTT indicated below is measured.

(1-2) Statistical Processing RTT Measurement Method

The statistical processing RTT is obtained by the RTT measurement unit 16 of the wireless base station 10 implementing many instances of measurement and removing variation using the measurement value statistical processing unit 31 of the position estimation server 30.

The sequence of FIG. 5 will be described as an example. The wireless base station 10 transmits the measurement signal to the wireless terminal station 20. This measurement signal is of a type such that the wireless terminal station 20 does not require a waiting time such as a backoff time when the measurement signal is received, and the wireless terminal station 20 can immediately send back the response signal. If a waiting time is required, the many instances of measurement cannot be performed in a short amount of time due to the influence of the waiting time. Furthermore, in the case of a signal that requires waiting for a random amount of time such as a backoff time in a wireless LAN, the random amount of time is included in the terminal delay time and the position estimation error will be large. For example, in the case of a data frame of a wireless LAN, it is necessary to wait for a random amount of time as the backoff time, but in the case of a management frame or an action frame, the wireless terminal station 20 that has received the measurement signal can immediately send back the response signal ACK without waiting for the backoff time.

Since there is a possibility that the wireless terminal station 20 will move during positioning, the RTT measurement unit 16 performs many instances of measurement of the RTT while sequentially switching the distributed antennas 11-1 to 11-n in a short amount of time via the antenna switching unit 13. For example, the RTT measurement unit 16 repeatedly executes a sequence of performing 10 instances of measurement using the distributed antenna 11-1, 10 instances of measurement using the distributed antenna 11-2, . . . , 10 instances of measurement using the distributed antenna 11-n, 10 instances of measurement using the distributed antenna 11-1, . . . , and performs about 100 instances of measurement in one second using all of the antennas.

In this manner, the many measured RTTs are sent to the position estimation server 30 and statistical processing of each distributed antenna is implemented by the measurement value statistical processing unit 31. The statistical processing includes a method using a moving average and a method using regression.

(1-2-1) Moving Average

A normal moving average is a method in which the average value of n past instances is found. However, in the case of a wireless LAN, the measurement signal cannot be transmitted at a given timing depending on the usage condition of the channel, and therefore the measurement interval is random. In view of this, a "moving average with respect to time", which is the average of the RTTs measured in the past n seconds, is used instead of the moving average with respect to the number of instances, which is the average of the RTTs of the past n instances. For example, the moving average of the RTTs measured in the past 10 seconds is obtained and is used as a statistical processing RTT in the calculation of the position estimation.

In the case of the average, if an abnormal value is included in the RTTs, the result will be significantly influenced. In view of this, a trimmed average in which abnormal values are excluded may also be used instead of a simple average.

Also, in order to give priority to more recent data while using past data to a certain extent, a weighted moving average is used. Since measurement of the RTTs is not performed in equal intervals, the weight of the most recent RTT is maximized, and using the difference in measurement time between the most recent RTT and a past RTT, the weight of the past RTT is reduced more the greater the time difference is. If the weight is to be reduced linearly with respect to the time difference, an old RTT whose time difference exceeds n seconds is given a weight of zero and discarded, and RTTs of n seconds to 0 seconds each have their weight set to (n−time difference)/n and the result of finding the average or the trimmed average is set as the statistical processing RTT. It is also possible to use a method in which the weight is reduced exponentially with respect to the time difference.

The number of seconds to which to set the moving average segment or the degree to which the weight is to be reduced according to the time difference needs to be determined according to the movement speed or the like of the wireless terminal station. The longer the segment is, and the higher the weight reduction rate is, the stronger the statistical processing will be, and thus the more the influence of variation in the terminal delay time can be reduced. However, a large delay will occur in the measurement result during movement at a high speed. In the case of an application in which the range of movement speeds is limited, fixed values that are set in advance need only be used. Otherwise, it is possible to employ a method in which the movement speed is estimated based on the position estimation result and switching is performed according to the movement speed. For example, the range of movement speeds can be divided into several ranges, the moving average segment length or the reduction rate can be determined for each range, and the value to be used in a future calculation can be switched according to the estimated movement speed.

(1-2-2) Regression

With the method using the moving average, past data always has an influence, and therefore data that is delayed by an amount of time that is about half of the moving average segment is obtained even if there is desire to know the position in real-time. In view of this, in the case of an application in which the movement speed is approximately constant, the current statistical processing RTT with no delay can be obtained by performing linear regression. In addition, by using a regression model corresponding to the movement pattern of the wireless terminal station, it is possible to obtain a statistical processing RTT with a higher accuracy.

(1-3) Using Both No-Delay RTT and Statistical Processing RTT

By performing many instances of measurement of the no-delay RTT and performing statistical processing thereon, it is also possible to obtain a no-delay RTT with an even higher accuracy.

(2) Removal of Measurement Error of RSSI

When the RTT measurement unit 16 of the wireless base station 10 performs many instances of measurement of the RTT, the RSSI measurement unit 17 performs many instances of measurement of the RSSI and removes variation using the measurement value statistical processing unit 31 of the position estimation server 30.

When the RTT is measured using the sequences shown in FIGS. 5 and 6, the wireless base station 10 and the wireless terminal station 20 exchange the measurement signal and the response signal. At this time, it is also possible to measure the RSSI. When the statistical processing RTT is used, many RTTs are measured in a short amount of time, but many RSSIs can be obtained in a short amount of time if the RSSIs are also measured by the RSSI measurement unit 17 at that time as well.

The RSSI is sent to the position estimation server 30 and is subjected to statistical processing using a method similar to that for the RTT in the measurement value statistical processing unit 31, and a "statistical processing RSSI" with variation removed is obtained. Normally, the RSSI is obtained in units of dBms, but since dBm has a logarithmic axis, it is converted into mW, and thereafter the moving average and regression are performed to obtain the statistical processing RSSI, and if needed, the statistical processing RSSI is once again converted into dBms.

(3) Coordinate Calculation

Processing performed by the coordinate calculation unit 32 of the position estimation server 30 will be described.

Hereinafter, gains and other properties of the distributed antennas 11-1 to 11-$n$ are the same. The cable lengths, loss, and other properties of the cables 12-1 to 12-$n$ connecting the wireless base station 10 and the distributed antennas 11-1 to 11-$n$ are the same. If the properties differ, the measurement values need only be converted into values that would be measured if the features were the same, and then subjected to position estimation calculation.

(3-1) One-Dimensional Position Estimation

If there are two distributed antennas in the wireless base station 10, positioning in one dimension is possible. It is assumed that the wireless terminal station 20 moves linearly between the two distributed antennas.

(3-1-1) One-Dimensional Position Estimation Using RTT

Figure 7:
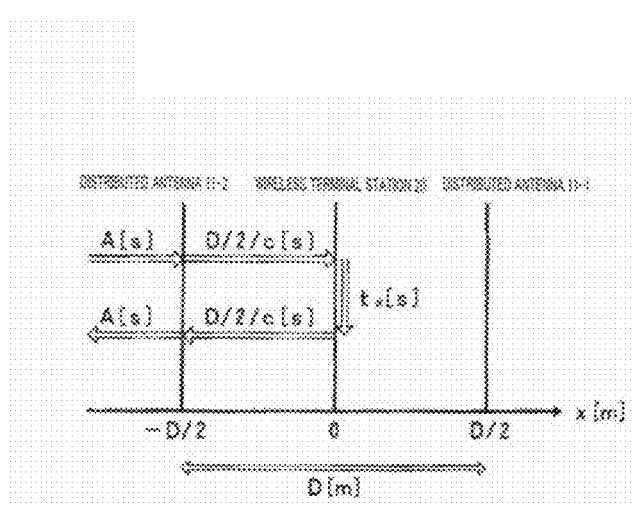
FIG. 7 is a diagram illustrating one-dimensional position estimation using an RTT.

FIG. 7 shows an example of an RTT path used when the wireless terminal station 20 is located in the center between the two distributed antennas 11-1 and 11-2. c is the speed of light 299792458 [m/s]. Letting A [s] be the one-way time of the cables 12-1 and 12-2 between the wireless base station 20 and the distributed antennas, D [m] be the distance between the distributed antennas, $t_d$ [s] be the terminal delay time, and $t_{rt2}$ [s] be the RTT measured by the distributed antenna 11-2, $$t_{rt2}=A+D/2/c+t_d+D/2/c+A=2A+t_d+D/c$$

is obtained. In this case, since the wireless terminal station 20 is located in the center between the two distributed antennas 11-1 and 11-2, when the RTT measured by the distributed antenna 11-1 is $t_{rt1}$ [s], it is the same as $t_{rt2}$, and therefore $$t_{rt1}=t_{rt2}=2A+t_d+D/c$$

is obtained.

Figure 8:
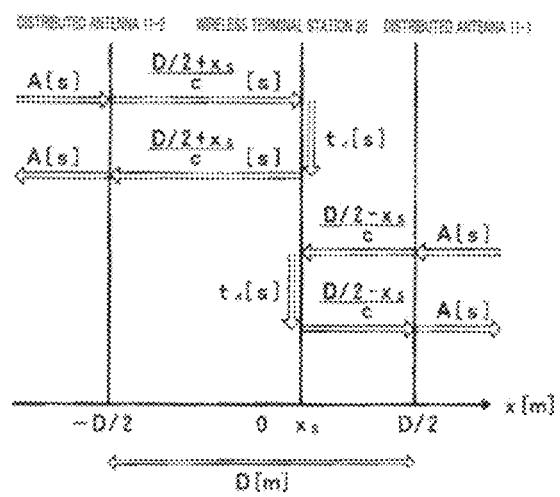
FIG. 8 is a diagram illustrating one-dimensional position estimation using an RTT.

FIG. 8 shows RTT paths used when the wireless terminal station 20 is located at the coordinate $x_s$ [m]. The RTTs are as follows.

$$t_{rt2}=A+(D/2+x_s)/c+t_d+(D/2+x_s)/c+A=2A+t_d+(D+2x_s)/c$$

$$t_{rt1}=A+(D/2-x_s)/c+t_d+(D/2-x_s)/c+A=2A+t_d+(D-2x_s)/c$$

If the no-delay RTT is used as the RTT, the terminal delay time $t_d$=0, and if the statistical processing RTT is used as the RTT, the terminal delay time $t_d$ is a constant value. Accordingly, the $t_d$ that is included in the RTT measured by the distributed antenna 11-1 and the $t_d$ that is included in the RTT measured by the distributed antenna 11-2 are both the same value.

Here, the difference between the RTTs is obtained.

$$t_{rt2}-t_{rt1}=(D+2x_s)/c-(D-2x_s)/c=4x_s/c$$

When this is solved for the coordinate $x_s$ of the wireless terminal station 20, $$x_s=c(t_{rt2}-t_{rt1})/4$$

is obtained.

According to the description above, if this equation is used, the one-dimensional coordinate $x_s$ of the wireless terminal station 20 can be obtained based on the no-delay RTTs or the statistical processing RTTs obtained from the two distributed antennas 11-1 and 11-2. With this calculation, A, D, and $t_d$ are all canceled out, and the only parameter other than the RTT is the speed of light c, which is a constant. Furthermore, since the calculation also need only directly calculate the solution to a linear equation, calculation can be performed at a low cost. Also, since the speed of light c is a constant that does not change depending on the location, accurate position estimation can be performed without requiring calibration at each location.

(3-1-2) One-Dimensional Position Estimation Using RSSI

B [dBm] is the statistical processing RSSI measured most recently by the two distributed antennas 11-1 and 11-2. $d_1$ [m] is the distance between the distributed antenna 11-1 and the wireless terminal station 20. $d_2$ [m] is the distance between the distributed antenna 11-2 and the wireless terminal station 20.

Since the two distributed antennas 11-1 and 11-2 and the wireless terminal station 20 are located on a straight line and D [m] is the distance between the distributed antennas, $D=d_1+d_2$ is satisfied. Also, letting R be the ratio between the distances to the distributed antennas 11-1 and 11-2, $R=d_1/d_2$ is obtained.

α is a transmission loss coefficient. a is a coefficient indicating the degree to which electromagnetic waves are attenuated due to the distance. In a free space in a vacuum, $\alpha=2$ is satisfied, but in actuality, α needs to be determined using some sort of method. λ is the wavelength.

Letting $RSSI_1$ [dBm] be the statistical processing RSSI measured by the distributed antenna 11-1 and $RSSI_2$ [dBm] be the statistical processing RSSI measured by the distributed antenna 11-2 when the wireless terminal station 20 is somewhere between the distributed antennas 11-1 and 11-2, the following equations are obtained.

$$RSSI_1 = B - 10\alpha \log_{10}\{(4\pi d_1)/\lambda\}$$

$$RSSI_2 = B - 10\alpha \log_{10}\{(4\pi d_2)/\lambda\}$$

Here, the difference between the statistical processing RSSIs is obtained.

$$RSSI_2 - RSSI_1 =$$
$$10\alpha\log_{10}\{(4\Pi d\,1)/\lambda\} - 10\alpha\log_{10}\{(4\Pi d\,2)/\lambda\} = 10\alpha\log_{10}(d_1/d_2)$$

When this is solved for the distance ratio R, $$R = d_1/d_2 = 10^{\wedge}\{(RSSI_2-RSSI_1)/10\alpha\} = (10^{1/10})^{\wedge}\{(RSSI_2-RSSI_1)/\alpha\}$$

is obtained.

Accordingly, the distance ratio R at which the wireless terminal station 20 is located between the distributed antennas 11-1 and 11-2 can be obtained. Furthermore, using the obtained distance ratio R and the distances $d_1$ and $d_2$ between the distributed antennas, $$D = d_1 + d_2$$

$$R = d_1/d_2$$

and thus $$d_2 = D/(R+1)$$

is obtained. Letting $x_s$ [m] be the coordinate of the wireless terminal station 20 obtained using the center between the distributed antennas 11-1 and 11-2 as an origin, $$x_s = d_2 - D/2 = D/(R+1) - D/2$$

is obtained, and thus the one-dimensional coordinate $x_s$ of the wireless terminal station 20 can be obtained.

With this calculation, B is canceled out, and therefore there is no need to actually measure the statistical processing RSSI near the distributed antennas 11-1 and 11-2, and the parameters do not need to be adjusted for each advantageous feature of the wireless terminal station 20. Since A has also been canceled out, the parameters do not need to be adjusted according to the difference in the channel (frequency). However, unlike with the RTT, a and D cannot be canceled out. Since a is a value that differs depending on the location, a needs to be determined using a method such as calibration. D also needs to be determined by accurately measuring the distance between the distributed antennas.

(3-1-3) One-Dimensional Position Estimation Using Three or More Distributed Antennas One-dimensional position estimation is possible also when three or more distributed antennas are located on a straight line. In this case, since the equation is overdetermined, a unique solution cannot be obtained, but the one-dimensional coordinate can be obtained by using the least-squares method.

Furthermore, when the statistical processing RTT and the statistical processing RSSI are obtained, the distribution and the standard deviation can be obtained at the same time, and the reciprocals thereof can be used as the weights of the least-squares method. Accordingly, it is possible to apply the least-squares method with priority given to the measurement value of the distributed antenna with the smallest amount of variation, and thus more accurate position estimation is possible. Furthermore, a weight that is larger the greater the number of instances of measuring is, a weight that is larger the shorter the distance is, a weight that is larger the smaller the RTT is, a weight that is larger the larger the RSSI is, and the like can be used as the weights. In particular, since the RSSI has a feature in which resolution is high in areas near the distributed antennas (area in which the distance is short and the RSSI is large) but resolution decreases as distance increases, by using such a weight, it is possible to give priority to a measurement value with a high resolution, and thus more accurate position estimation is possible.

(3-2) Two-Dimensional Position Estimation

By using three distributed antennas, it is possible to perform two-dimensional position estimation. It is assumed that all of the distributed antennas are present on one plane and the wireless terminal station 20 moves only on the plane.

(3-2-1) Two-Dimensional Position Estimation Using RTT ($x_i$, $y_i$) (known values in units of [m]) are the coordinates of the distributed antenna 11-$i$ (i=1, 2, 3). ($x_s$, $y_s$) (unknown values in units of [m]) are the coordinates of the wireless terminal station 20. $t_{rti}$ [s] is the no-delay RTT or the statistical processing RTT measured by the distributed antenna 11-$i$ (measurement value). $l_c$ [m] is the length obtained by converting the cable length from the wireless base station 20 to the distributed antenna 11-$i$ into a transmission distance in a free space.

A pseudo-distance $l_{pi}$ [m] obtained by removing the delay time resulting from the cable length from the $t_{rti}$ which is the measurement result, and correcting to a one-way distance, is obtained.

$$l_{pi} = ct_{rti}/2 - l_c$$

$l_d$ [m], which is equivalent to the one-way distance for the terminal delay time $t_d$ [s] is set as follows.

$$l_d = ct_d/2$$

Letting $l_i$ [m] be the true distance between the distributed antenna 11-$i$ and the wireless terminal station 20, the relationship between the true distance and the pseudo-distance is such that $$l_{pi} = l_i + l_d$$

is satisfied. On the other hand, since the relationship between the coordinates and the true distance is such that $$l_i = \{(x_i - x_s)^2 + (y_i - y_s)^2\}^{1/2}$$

is satisfied, the relationship between the pseudo-distance and the coordinates is such that $$l_{pi} = \{(x_i - x_s)^2 + (y_1 - y_s)^2\}^{1/2} + l_d$$

is satisfied.

According to the above description, the following simultaneous equations need only be solved in order to obtain the two-dimensional coordinates of the wireless terminal station 20 using the three distributed antennas 11-1 to 11-3.

$$l_{p1} = \{(x_1 - x_s)^2 + (y_1 - y_s)^2\}^{1/2} + l_d$$

$$l_{p2} = \{(x_2 - x_s)^2 + (y_2 - y_s)^2\}^{1/2} + l_d$$

$$l_{p3} = \{(x_3 - x_s)^2 + (y_3 - y_s)^2\}^{1/2} + l_d$$

Among these, $x_s$, $y_s$, and $l_d$ are unknown numbers, and others are known values and values determined based on measurement values. Since there are three unknown numbers in a three-dimensional simultaneous equation, this equation can be solved, but since it is a non-linear equation, it is generally difficult to solve. In view of this, the equation can be solved through an approximation calculation using Newton's method and the like.

(3-2-2) Two-Dimensional Position Estimation Using RSSI

With the one-dimensional calculation, it was possible to obtain a distance ratio between the two distributed antennas based on the difference in the statistical processing RSSIs measured by two distributed antennas. With only the distance ratio, the position can be obtained using a similar calculation, even if the positions of the two distributed antennas and the wire terminal station are not on the same line. Accordingly, the distance ratios for all combinations of two distributed antennas among the three distributed antennas on the plane can be obtained based on the differences between the statistical processing RSSIs. It is possible to obtain the coordinates of the wireless terminal station 20 by assembling an equation based on these distance ratios and the coordinates of each distributed antenna. Since this equation is also non-linear, it can be solved through an approximation calculation using Newton's method and the like.

(3-2-3) Two-Dimensional Position Estimation Using Four or More Distributed Antennas Two-dimensional position estimation is possible also when four or more distributed antennas are located on a plane. In this case, since the equation is overdetermined, a unique solution cannot be obtained, but the coordinates can be obtained by using the least-squares method. Amore accurate position estimation is also possible by performing weighting similar to the case of one dimension.

(3-3) Three-Dimensional Position Estimation

By using four distributed antennas, it is possible to perform three-dimensional position estimation.

(3-3-1) Three-Dimensional Position Estimation Using RTT $(x_i, y_i, z_i)$ (known values in units of [m]) are the coordinates of a distributed antenna 11-$i$ (i=1, 2, 3, 4). $(x_s, y_s, z_s)$ (unknown values in units of [m]) are the coordinates of the wireless terminal station 20. Otherwise, the three-dimensional position estimation is similar to the two-dimensional position estimation.

In three dimensions, the relationship between the coordinates and the true distance is such that $$l_i = \{(x_i - x_s)^2 + (y_i - y_s)^2 + (z_i - z_s)_2\}^{1/2}$$

is satisfied, and therefore the relationship between the pseudo-distance and the coordinates is such that $$l_{pi} = \{(x_i - x_s)^2 + (y_i - y_s)^2 + (z_i - z_s)^2\}^{1/2} + l_d$$

is satisfied.

According to the above description, the following simultaneous equations need only be solved in order to obtain the three-dimensional coordinates of the wireless terminal station 20 using the four distributed antennas 11-1 to 11-4.

$$l_{p1} = \{(x_1 - x_s)^2 + (y_1 - y_s)^2 + (z_1 - z_s)^2\}^{1/2} + l_d$$

$$l_{p2} = \{(x_2 - x_s)^2 + (y_2 - y_s)^2 + (z_2 - z_s)^2\}^{1/2} + l_d$$

$$l_{p3} = \{(x_3 - x_s)^2 + (y_3 - y_s)^2 + (z_3 - z_s)^2\}^{1/2} + l_d$$

$$l_{p4} = \{(x_4 - x_s)^2 + (y_4 - y_s)^2 + (z_4 - z_s)^2\}^{1/2} + l_d$$

Among these, $x_s$, $y_s$, $z_s$, and $l_d$ are unknown numbers, and others are known values and values determined based on measurement values. Since there are four unknown numbers in a four-dimensional simultaneous equation, this equation can be solved, but since it is a non-linear equation, it is generally difficult to solve. In view of this, the equation can be solved through an approximation calculation using Newton's method and the like.

(3-3-2) Three-Dimensional Position Estimation Using RSSI

Similarly to the one-dimensional and two-dimensional calculations, the distance ratios between each set of two antennas can be obtained, and therefore the distance ratios for all combinations of two antennas among the four antennas can be obtained based on the differences in the statistical processing RSSIs. It is possible to obtain the coordinates of the wireless terminal station by assembling an equation based on these distance ratios and the coordinates of the antennas. Since this equation is also non-linear, it can be solved through an approximation calculation using Newton's method and the like.

(3-3-3) Three-Dimensional Position Estimation Using Five or More Distributed Antennas Three-dimensional position estimation is possible also when five or more distributed antennas are located in a space. In this case, since the equation is overdetermined, a unique solution cannot be obtained, but the coordinates can be obtained by using the least-squares method. A more accurate position estimation is also possible by performing weighting similar to the case of one dimension and two dimensions.

(3-4) Different Properties

If the gains and other properties of the distributed antennas are not the same, the values are converted to values that would be measured if distributed antennas with the same properties were used. For example, if only one of the multiple distributed antennas has a gain that is 3 dB lower, coordinate calculation need only be performed after adding 3 dB to the RSSI measured by that antenna.

Similarly, if the cable length, loss, and other properties are not the same for the cables 12 connecting the wireless base station 10 and the distributed antennas 11, the measurement values are converted into values that would be measured if identical cables were used. For example, if the cable length of only one cable 12 is 1 m longer, the coordinate calculation need only be performed after subtracting 1×2×c [s], which corresponds to the round-trip length of 1 m, from the RTT measured with that distributed antenna. Also, if only one cable 12 has a loss that is 3 dB greater due to the cable length, the cable properties, or the like, the coordinate calculation need only be performed after adding 3 dB to the RSSI measured using that cable.

(4) Coordinate Stabilization

Even if the wireless terminal station 20 is stationary, coordinates obtained by the coordinate calculation unit 32 (hereinafter, momentary value coordinates) fluctuate slightly in some cases. In view of this, coordinates (hereinafter, stabilized coordinates) from which this slight fluctuation has been removed may also be obtained by the coordinate stabilization unit 33.

Figure 9:
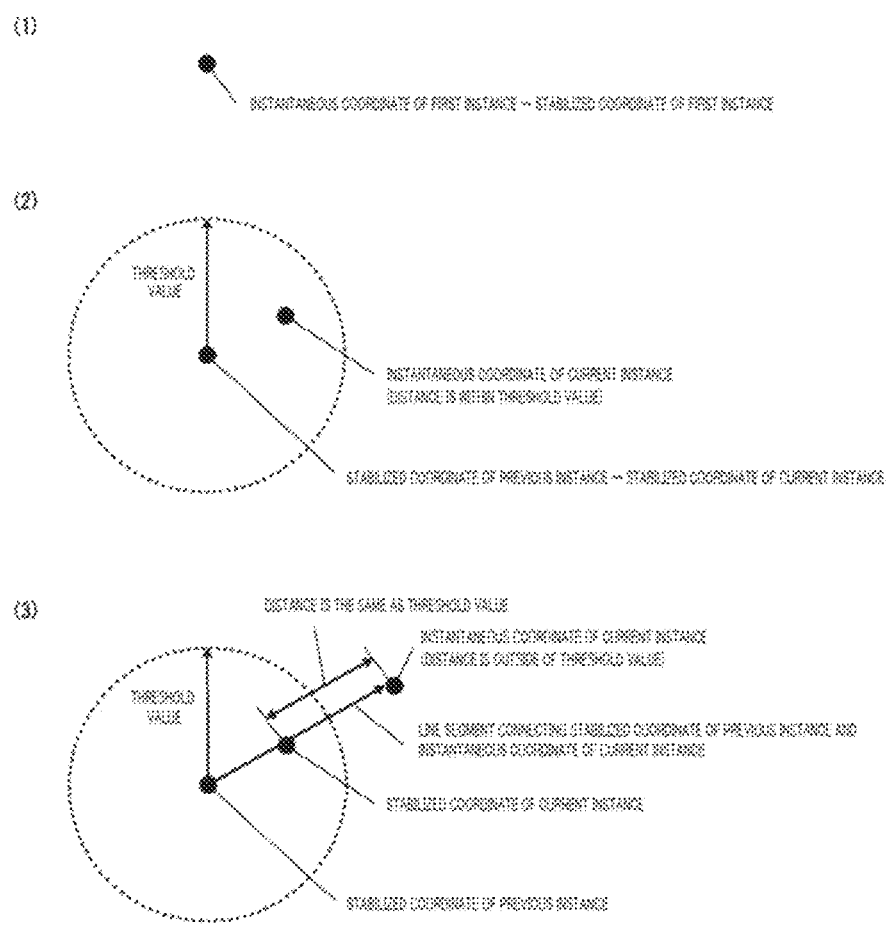
FIG. 9 is a diagram showing an example of processing performed by a coordinate stabilization unit 33.
Figure 10:
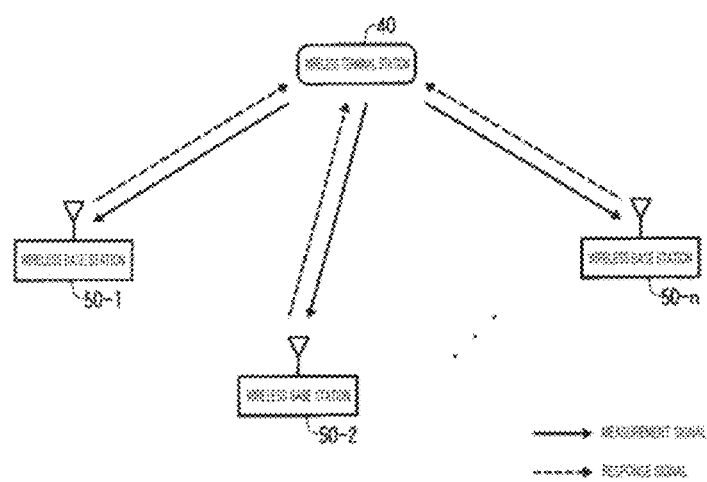
FIG. 10 is a diagram illustrating a conventional wireless terminal station position estimation method.

FIG. 9 is a diagram showing an example of processing performed by the coordinate stabilization unit 33.

In FIG. 9(1), instantaneous coordinates are output as-is as the stabilized coordinates of a first instance.

In FIG. 9(2), in the second instance and onward, the distance between the stabilized coordinates of the previous instance and the instantaneous coordinates of the current instance is obtained. If the distance does not exceed a threshold value (e.g., 1 m), the stabilized coordinates of the first instance are output as-is as the instantaneous value coordinates of the second instance.

In FIG. 9(3), if the distance exceeds the threshold value, the location at which the distance between the stabilized coordinates of the previous instance and the instantaneous coordinates of the current instance reach the threshold value on a line segment connecting the stabilized coordinates of the previous instance and the instantaneous coordinates of the current instance is output as the instantaneous coordinates of the current instance.

Accordingly, stabilized coordinates from which coordinate fluctuation of less than the threshold value has been removed can be obtained. If the threshold value is small, the coordinate fluctuation that occurs when the wireless terminal station is stationary cannot be removed, but if the threshold value is large, the trackability of the movement of the wireless terminal station deteriorates, and therefore it is necessary to set a value that is suitable according to the application and the location. A method is also conceivable in which the threshold value is switched in response to the circumstance, depending on the area, speed, or the like.

Furthermore, more accurate positioning is also possible by integrating the coordinate calculation results obtained using the RTT and the coordinate calculation results obtained using the RSSI. Examples of integration methods include a method of simply finding the average of the coordinates of the positioning results obtained using the RTT and the coordinates of the positioning results obtained using the RSSI, and the average may also be found with weights set for each set of coordinates. The weight may also be set to be fixed, and if each location is divided into an area that specializes in the RTT and an area that specializes in the RSSI, it is also possible to use a method in which separate weights are prepared and used for each area.

Note that the function of the position estimation server 30 can be realized also by a computer and a program, and the program can be recorded in a recording medium and can be provided through a network.

REFERENCE SIGNS LIST

10 Wireless base station
11 Distributed antenna
12 Cable
13 Antenna switching unit
14 Signal transmission unit
15 Signal reception unit
16 RTT measurement unit
17 RSSI measurement unit
18 Clock
20 Wireless terminal station
21 Antenna
22 Signal reception unit
23 Signal transmission unit
24 Control unit
25 Clock
30 Position estimation server
31 Measurement value statistical processing unit
32 Coordinate calculation unit
33 Coordinate stabilization unit

The invention claimed is:

1. A position estimation apparatus configured to estimate a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation apparatus comprising:
   a processor; and
   a storage medium having computer program instructions stored thereon, when executed by the processor, perform to:
   measure a no-delay RTT or measure a statistical processing RTT when the wireless base station exchanges a measurement signal and a response signal with the wireless terminal station in each of the distributed antennas and measures an RTT, which is a round trip time between the wireless base station and the wireless terminal station, a delay time having been removed from the no-delay RTT using a reception time of the measurement signal and a transmission time of the response signal, and the statistical processing RTT being measured using statistical processing for making the delay time constant using a plurality of instances of exchanging a measurement signal and a response signal; and
   estimate the position of the wireless terminal station based on the no-delay RTT or the statistical processing RTT of each of the distributed antennas.

2. The position estimation apparatus according to claim 1, wherein the wireless terminal station is configured to move on a straight line on which two or more of the distributed antennas are arranged in one dimension, and the computer program instructions further perform to estimate a one-dimensional position of the wireless terminal station using a difference between the no-delay RTTs or a difference between the statistical processing RTTs obtained via the distributed antennas.

3. The position estimation apparatus according to claim 1, wherein the wireless terminal station is configured to move on a two-dimensional plane on which three or more of the distributed antennas are arranged or in a three-dimensional space in which four or more of the distributed antennas are arranged; and the computer program instructions further perform to estimate a two-dimensional position or a three-dimensional position of the wireless terminal station by combining the positions of the distributed antennas and the no-delay RTTs or the statistical processing RTTs obtained for every two of the distributed antennas.

4. A position estimation apparatus configured to estimate a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation apparatus comprising:
- a processor; and
- a storage medium having computer program instructions stored thereon, when executed by the processor, perform to:
- measure a statistical processing RSSI, when the wireless base station exchanges a measurement signal and a response signal with the wireless terminal station in each of the distributed antennas and measures an RSSI, which is a received signal strength indicator of the wireless base station, the statistical processing RSSI being measured using statistical processing for eliminating an RSSI measurement error using a plurality of instances of exchanging a measurement signal and a response signal; and
- estimate the position of the wireless terminal station based on the statistical processing RSSI of each of the distributed antennas.

5. The position estimation apparatus according to claim 4, wherein the wireless terminal station is configured to move on a straight line on which two or more of the distributed antennas are arranged in one dimension, and the computer program instructions further perform to estimate a one-dimensional position of the wireless terminal station by using a distance between the distributed antennas, transmission loss coefficients of the distributed antennas, and a difference between the statistical processing RSSIs obtained via the distributed antennas.

6. The position estimation apparatus according to claim 4, wherein the wireless terminal station is configured to move on a two-dimensional plane on which three or more of the distributed antennas are arranged or in a three-dimensional space in which four or more of the distributed antennas are arranged; and the computer program instructions further perform to estimate a two-dimensional position or a three-dimensional position of the wireless terminal station by combining the positions of the distributed antennas, distances between the distributed antennas, the transmission loss coefficients of the distributed antennas, and differences between the statistical processing RSSIs obtained for every two of the distributed antennas.

7. A position estimation method for estimating a position of a wireless terminal station between a wireless base station that can perform transmission and reception by switching between a plurality of distributed antennas arranged in a distributed manner via cables with known lengths, and the wireless terminal station configured to communicate with the wireless base station, the position estimation method comprising:
- measuring a no-delay RTT or measuring a statistical processing RTT when the wireless base station exchanges a measurement signal and a response signal with the wireless terminal station in each of the distributed antennas and measures an RTT, which is a round trip time between the wireless base station and the wireless terminal station, a delay time having been removed from the no-delay RTT using a reception time of the measurement signal and a transmission time of the response signal, and the statistical processing RTT being measured using statistical processing for making the delay time constant using a plurality of instances of exchanging a measurement signal and a response signal; and
- estimating the position of the wireless terminal station based on the no-delay RTT or the statistical processing RTT of each of the distributed antennas.

* * * * *